United States Patent [19]

Masuda et al.

[11] Patent Number: 4,641,854
[45] Date of Patent: Feb. 10, 1987

[54] WHEEL SUSPENSION FOR A VEHICLE

[75] Inventors: Tatsuo Masuda; Akito Enokimoto; Kazutoshi Ohtsuka, all of Saitama, Japan

[73] Assignee: Honda Giken Kogyo Kabushiki Kaisha, Tokyo, Japan

[21] Appl. No.: 757,675

[22] Filed: Jul. 22, 1985

[30] Foreign Application Priority Data

Jul. 25, 1984 [JP] Japan ................................ 59-154243
Jul. 25, 1984 [JP] Japan ............................ 59-112637[U]

[51] Int. Cl.⁴ .............................................. B60G 3/00
[52] U.S. Cl. .................................. 280/701; 180/73.3; 280/688
[58] Field of Search ............... 280/6 R, 6.1, 6 H, 707, 280/701, 690, 705, 725, 726, 697, 698, 699, 700, 688; 180/73.3, 73.4, 73.5

[56] References Cited

U.S. PATENT DOCUMENTS 3,123,378  3/1964  Caldwell ............................ 280/701

FOREIGN PATENT DOCUMENTS 698921  12/1965  Italy .................................... 280/701

Primary Examiner—Richard A. Bertsch
Attorney, Agent, or Firm—Irving M. Weiner; Joseph P. Carrier; Pamela S. Burt

[57] ABSTRACT

A wheel suspension in a vehicle having a frame structure and a drive shaft mounted on the frame structure for driving a wheel to rotate about a wheel shaft thereof, includes a trailing arm having a front end pivotably connected to the frame structure and a rear end supporting the wheel shaft of the wheel, a propeller shaft having a first end coupled to the drive shaft through a first universal joint and an opposite end coupled to the wheel shaft through a second universal joint, a link rod having a first end pivotably connected to the frame structure and an opposite end pivotably connected to the rear end of the trailing arm, and a cushioning unit supporting the trailing arm on the frame structure for dampening movement of the trailing arm with respect to the frame structure. The propeller shaft extends substantially transversely of the frame structure, and the link rod is spaced substantially vertically from the propeller shaft and, also, extends substantially transversely of the frame structure. The wheel suspension has an increased minimum height from the ground on which the wheel rests, is relatively simple in structure, small in size or volume, and has a small unsprung weight.

4 Claims, 5 Drawing Figures

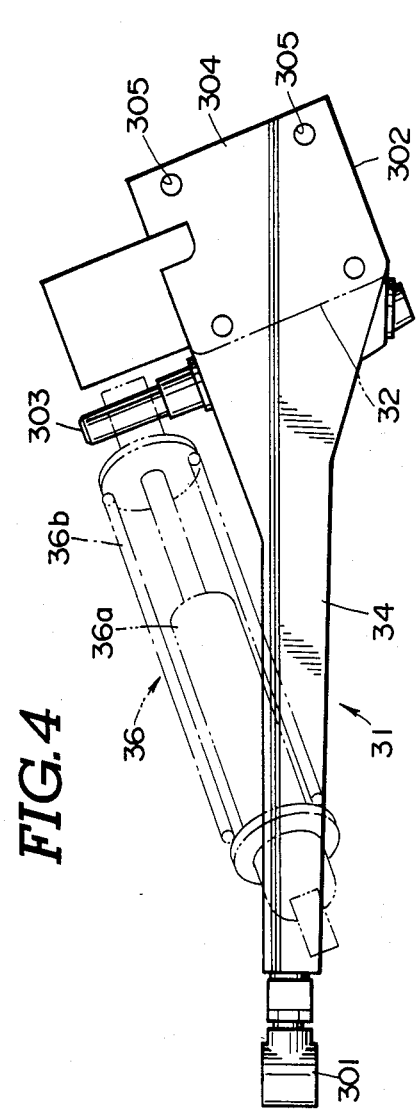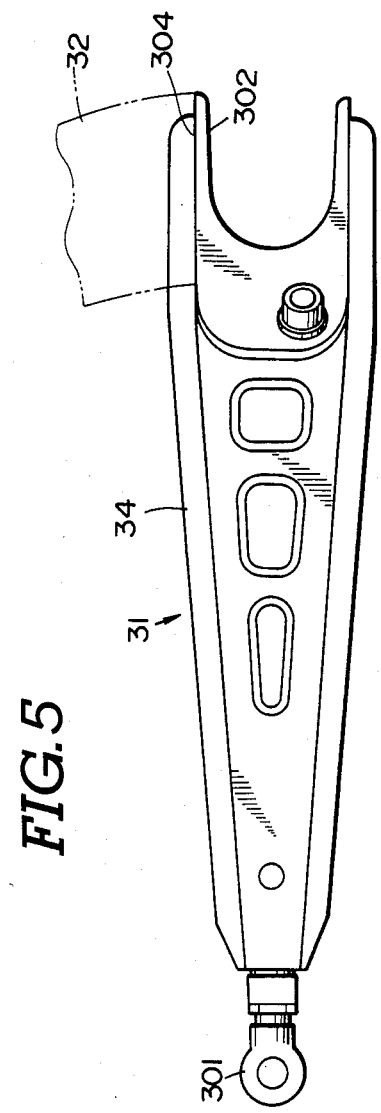

WHEEL SUSPENSION FOR A VEHICLE

BACKGROUND OF THE INVENTION

1. Field of the Invention

The present invention relates to a wheel suspension for a vehicle, and more particularly to a suspension for suspending drive wheels on the vehicle frame.

2. Description of Relenant Art

Various suspensions for suspending drive wheels on the vehicle frame are known. Several types of trailing arm suspensions have been proposed for suspending drive wheels. However, none of such existing or proposed suspensions disclose or make obvious the novel wheel suspension defined and claimed in the present application.

SUMMARY OF THE INVENTION

It is an object of the present invention to provide a trailing arm suspension of a novel construction for suspending a drive wheel of a vehicle, the trailing arm suspension having an increased minimum height from the ground.

Another object of the present invention is to provide a trailing arm suspension which is relatively simple in structure, small in size or volume, and has a small unsprung weight.

According to the present invention, there is provided a wheel suspension for a vehicle having a frame structure and a drive shaft mounted on the frame structure for driving a wheel to rotate about a wheel shaft thereof. The the wheel suspension includes a trailing arm having a front end pivotably connected to the frame structure and a rear end supporting the wheel shaft of the wheel, a propeller shaft having a first end coupled to the drive shaft through a first universal joint and an opposite end coupled to the wheel shaft through a second universal joint, a link rod having a first end pivotably connected to the frame structure and an opposite end pivotably connected to the rear end of the trailing arm, and a cushioning unit supporting the trailing arm on the frame structure for dampening movement of the trailing arm with respect to the frame structure. The propeller shaft extends substantially transversely of the frame structure, and the link rod is spaced substantially vertically from the propeller shaft and, also, extends substantially transversely of the frame structure.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 4 is an enlarged plan view of the beam of a trailing arm employed in the suspension of FIG. 1, the view showing a cushioning unit in the phantom lines.

FIG. 5 is a side elevational view of the beam of FIG. 4, the view showing the lower end of a stay for the trailing arm in the phantom lines.

DETAILED DESCRIPTION OF THE PREFERRED EMBODIMENT

Figure 1:
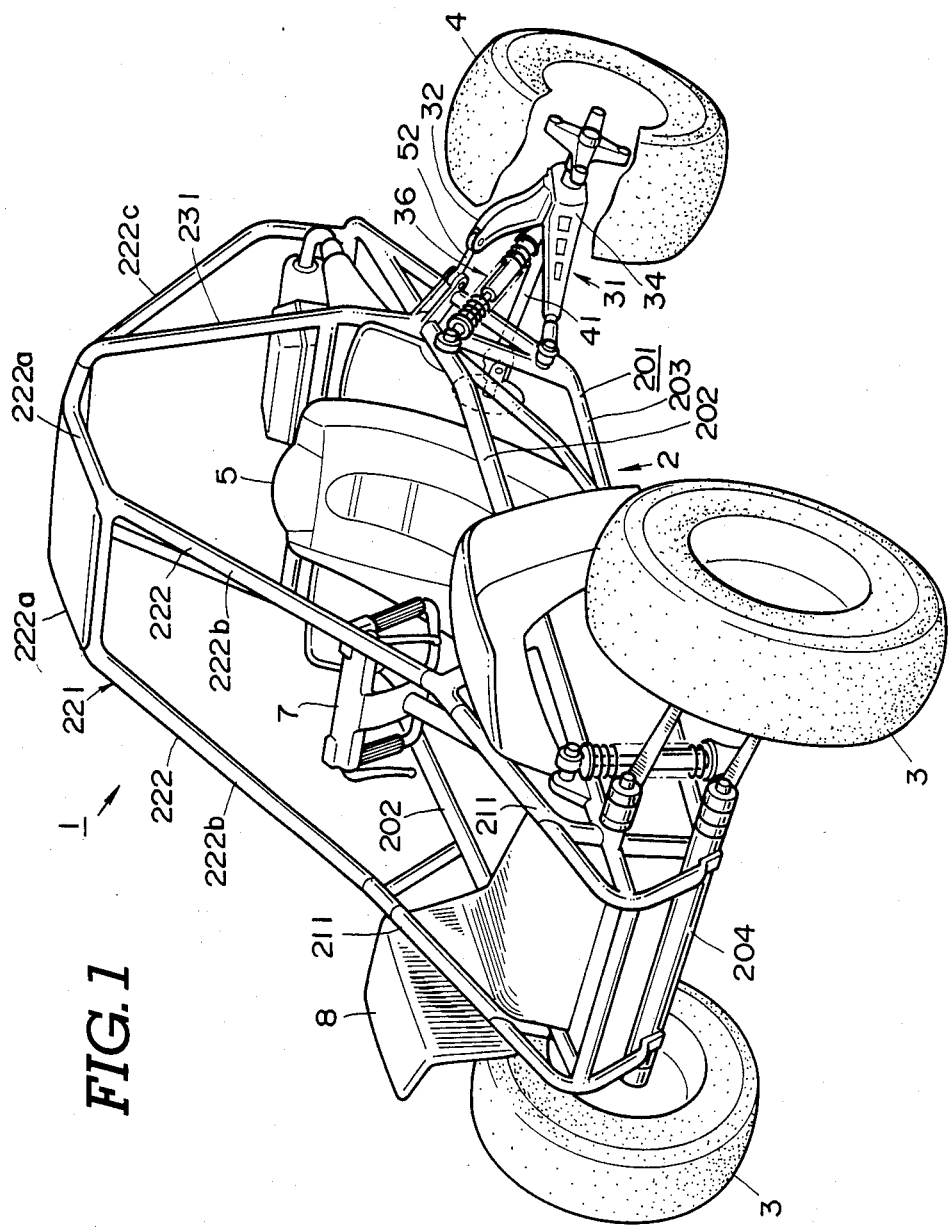
FIG. 1 is a perspective view of view of a vehicle incorporating a suspension for suspending a rear wheel according to the present invention, the rear wheel being shown as being partly broken away for illustrating the suspension.

As shown in FIG. 1, a vehicle 1 comprising a buggy-type four-wheeled automobile having no body panels has a frame structure 2, two front wheels 3, 3 suspended on the front portion of the vehicle frame 2, and two rear wheels 4, 4 suspended on the rear portion of the vehicle frame 2. The frame structure 2 includes a pair of transversely spaced main frames 201 each composed of upper and lower pipes 202, 203. The lower pipes 203 of the main frames 201 are interconnected at their front ends by a cross pipe 204. A driver's seat 5 is supported on the main frames 201 between the front and rear wheels 3, 4. A steering wheel 7 is operatively connected to the front wheels 3 for steering the same and positioned in the front portion of the frame structure 2 in front of the driver's seat 5. A pair of fenders 8, 9 is mounted on the front portion of the frame structure 2 in overhanging relation to the front wheels 3.

The frame structure 2 includes a pair of front frames 211, 211 extending obliquely upwardly from the forward portions of the main frames 201, 201, respectively. A roll bar 221 disposed over the main frames 201, 201 includes two symmetrical pipes 222, 222 having intermediate portions 222a, 222a, respectively, lying above the driver's seat 5. The pipes 222, 222 also include front portions 222b, 222b slanted donwardly and forwardly and having front ends coupled to the rear ends of the front frames 211, 211, respectively, and rear portions 222c, 222c slanted downwardly and rearwardly and having rear ends coupled to the rear ends of the upper pipes 202, 202, respectively.

Figure 2:
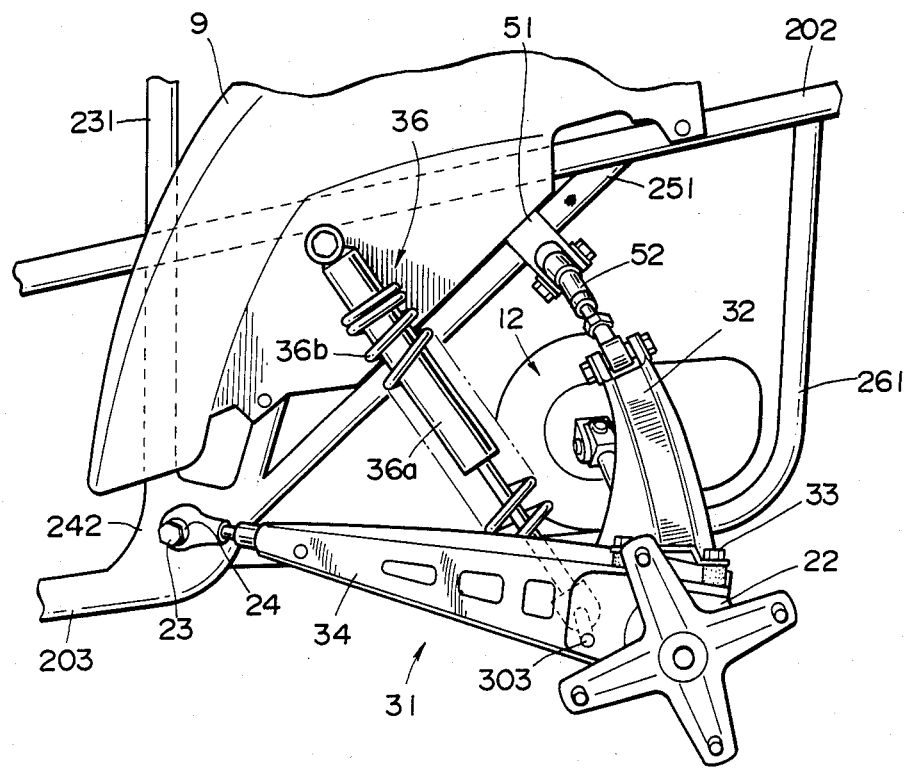
FIG. 2 is an enlarged side elevational view of the suspension illustrated in FIG. 1.
Figure 3:
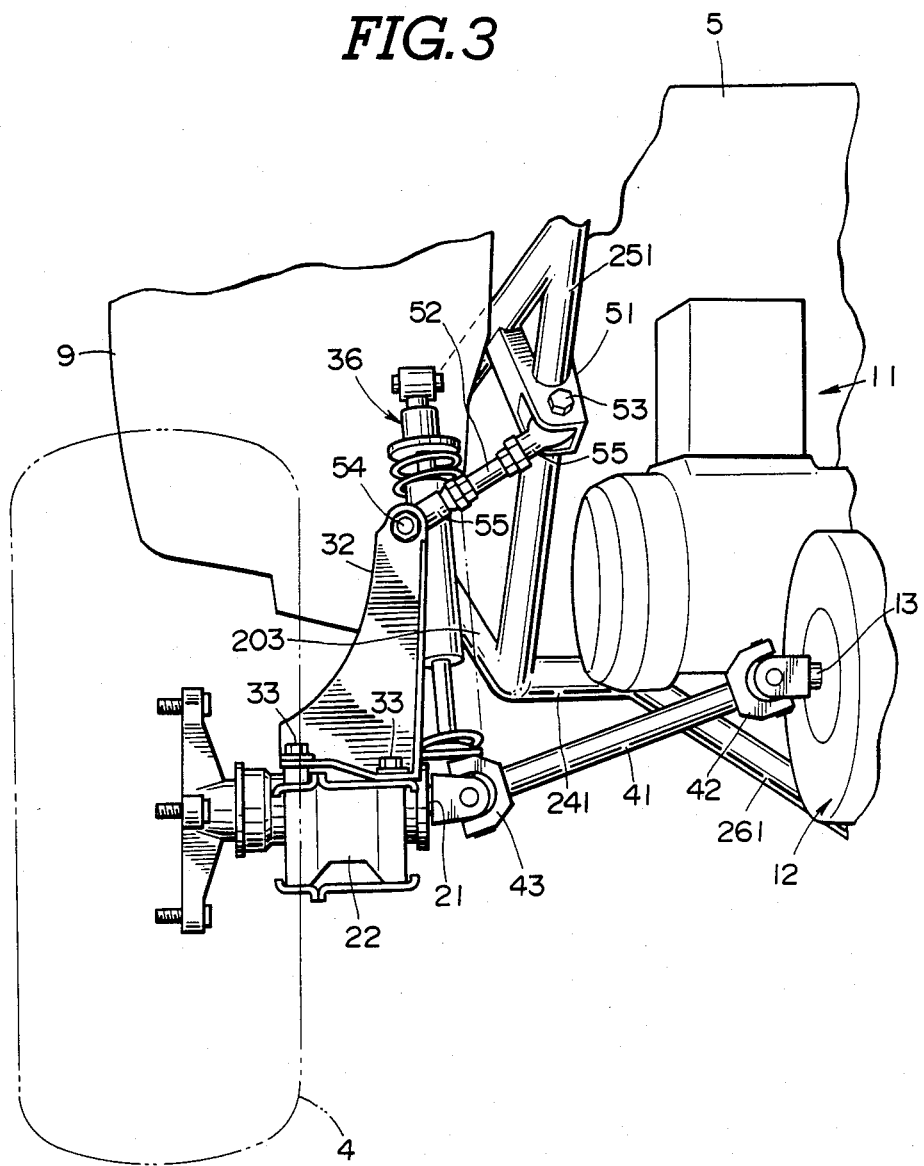
FIG. 3 is an enlarged rear elevational view of the suspension shown in FIG. 1.

The rear ends of the intermediate portions 222a, 222a, the rear ends of the upper pipes 202, 202, and the rear ends of the lower pipes 203, 203 are interconnected by vertical rear pipes 231, 231. The junctions between the lower pipes 203 and the rear pipes 231 are interconnected by a cross pipe 241 (FIG. 3), each of the junctions having a bracket 242 (FIG. 2). As shown in FIG. 3, the lower pipe 203 has an upwardly slanted portion 251 extending rearwardly beyond the bracket 242 and having a distal end connected to the rear end of the upper pipe 202.

As illustrated in FIG. 3, an engine 11 positioned behind the driver's seat 5 is mounted on rear frames 261 (one shown) joining the cross pipe 241 and the rear ends of the upper pipes 202, 202. The engine 11 is operatively coupled through a belt-and-pulley mechanism (not shown) to a transmission mechanism 12 mounted on the rear frames 261 behind the engine 11. The transmission mechanism 12 has a pair of output drive shafts 13 (one shown) extending transversely and having outer ends projecting out of the side walls of the transmission case.

As shown in FIGS. 1 and 2, the rear wheel suspension includes a trailing arm 31 having a front end pivotably connected by a support pin 23 and a spherical bushing 24 to the bracket 242 fixed to the frame structure 2. The trailing arm 31 is therefore vertically angularly movable with respect to the frame structure 2. The spherical bushing 24 on the support pin 23 allows the trailing arm 31 to be angularly moved slightly transversely with respect to the frame structure 2. The trailing arm 31 extends substantially vertically with respect to the frame structure 2, and is tilted such that its rear end is positioned slightly outwardly of the front end thereof.

The trailing arm 31 also includes a shaft holder 22 on which the wheel shaft 21 of the rear wheel 4 is rotatably supported, and a stay 32 connecting one end of a link rod 52 (described later) to a beam 34 of the trailing arm 31. The shaft holder 22 and the stay 32 constitute part of the rear end of the trailing arm 31. More specifically, as shown in FIGS. 4 and 5, the beam 34 is formed from a metal sheet, incudes at the front end an eye 301 for insertion of the support pin 23 therethrough, and includes a recess 302 defined in the rear end for attachment of the shaft holder 22. A shaft 303 is welded to the beam 34 in front of the recess 32, the shaft 303 projects inwardly with respect to the frame structure 2. The recess 302 is bounded at its upper edge by a plate 304 having bolt holes 305 defined therein. The lower end of the stay 32 is held against the upper surface of the plate 304. The stay 32 and the shaft holder 22 disposed in the recess 302 are fixed to the beam 34 by means of bolts 33 as shown in FIGS. 2 and 3.

As illustrated in FIG. 3, the outer end of the output drive shaft 13 of the transmission mechanism 12 and the inner end of the wheel shaft 21 are interconnected by a propeller shaft 41 extending obliquely rearwardly of the frame structure 2 and substantially transversely thereof. The propeller shaft 41 has opposite ends coupled through first and second universal joints 42, 43 to the output drive shaft 13 and the wheel shaft 21. The propeller shafts 41 (one shown) are rotated by the engine 11 through the transmission mechanism 12 to drive the two rear wheels 4, 4.

As shown in FIGS. 2 and 3, a bracket 51 is attached to and lies between an upper portion of the slanted portion 251 of the lower pipe 203 and the upper pipe 202. The bracket 51 and the upper end of the stay 32 are interconnected by a link rod 52 extending obliquely rearwardly of the frame structure 2 and substantially transversely thereof. The link rod 52 has opposite ends pivotably coupled to the bracket 51 and the stay 32 by support pins 53, 54, respectively. The link rod 52 is shorter than the propeller shaft 41, and the length of the link rod 52 is adjustable by adjustable rod ends 55, 55 thereof.

The trailing arm 31, the propeller shaft 41, and the link rod 52 jointly constitute a link mechanism for controlling the movement of the rear wheel 4. The link mechanism serves to keep the angle of the wheel shaft 21 substantially constant with respect to the frame structure 2 when the rear wheel 4 is vertically swung. Stated otherwise, the link mechanism controls the movement of the wheel shaft 21 so that the wheel shaft 21 will be substantially translated when the trailing arm 31 is vertically swung.

As shown in FIG. 2, the trailing arm 31 is supported by a cushioning unit 36 for dampening the vertical swinging movement of the trailing arm 31. The cushioning unit 36 comprises a shock absorber 36a having one end pivotably connected to the frame structure 2 and the other end pivotably connected to the trailing arm 31 by the shaft 303, and a coil spring 36b disposed coaxially around the shock absorber 36a. The coil spring 36b has opposite ends operatively connected to the frame structure 2 and the trailing arm 31 through the ends of the shock absorber 36a for supporting the trailing arm 31.

With the above arrangement, there are no members employed which are positioned below the shaft holder 22 supporting the wheel shaft 21 and the propeller shaft 41 coupled to the wheel shaft 21. Therefore, the wheel suspension has an increased miminum height above the ground on which the rear wheel 4 rests. The wheel suspension is made up of a relatively small number of components, is hence relatively small in size or volume, and has a small unsprung weight.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A wheel suspension in a vehicle having a frame structure and drive shaft mounted on said frame structure for driving a wheel to rotate about a wheel shaft thereof, said wheel suspension comprising:
    a trailing arm having a front end pivotably connected to said frame structure and a rear end supporting said wheel shaft of the wheel;
    a propeller shaft having a first end coupled to said drive shaft through a first universal joint and an opposite end coupled to said wheel shaft through a second universal joint, said propeller shaft extending substantially transversely of said frame structure;
    a link rod having a first end pivotably connected to said frame structure and an opposite end pivotably connected to said rear end of said trailing arm, said link rod being spaced substantially vertically from said propeller shaft and extending substantially transversely of said frame structure; and
    damper means supporting said trailing arm on said frame structure for dampening movement of said trailing arm with respect to said frame structure;
    said propeller shaft, said link rod, and said trailing arm jointly constitute a link mechanism for controlling movement of said wheel shaft to translate the wheel shaft when said trailing arm is vertically swung; and
    said damper means comprises a cushioning unit composed of a shock absorber and a coil spring disposed therearound, said shock absorber having a first end pivotably connected to said frame structure and an opposite end pivotably connected to said trailing arm.

2. A wheel suspension according to claim 1, wherein said trailing arm includes a beam having an eye on a front end thereof, a shaft holder fixed to a rear end of said beam and supporting said wheel shaft, and a stay fixed to said rear end of the beam and projecting upwardly, said opposite end of said link rod being coupled to an upper end of said stay.

3. A wheel suspension according to claim 2, wherein said link rod is adjustable in length.

4. A wheel suspension according to claim 1, wherein:
    said front end of said trailing arm is pivotably connected to said frame structure by a support pin and a spherical bushing.

* * * * *